(12) United States Patent
Ardes

(10) Patent No.: US 10,539,052 B2
(45) Date of Patent: Jan. 21, 2020

(54) OIL FILTER CARTRIDGE AND HOUSING FOR AN OIL FILTER CARTRIDGE

(71) Applicant: Hengst SE, Münster (DE)

(72) Inventor: Wilhelm Ardes, Ascheberg (DE)

(73) Assignee: Hengst SE & Co. KG, Münster (DE)

( * ) Notice: Subject to any disclaimer, the term of this patent is extended or adjusted under 35 U.S.C. 154(b) by 0 days.

(21) Appl. No.: 16/029,315

(22) Filed: Jul. 6, 2018

(65) Prior Publication Data

US 2018/0328244 A1 Nov. 15, 2018

Related U.S. Application Data

(63) Continuation of application No. PCT/EP2017/062063, filed on May 19, 2017.

(30) Foreign Application Priority Data

May 23, 2016 (EP) .................................. 16170925

(51) Int. Cl.

| F01M 11/03 | (2006.01) |
| B01D 29/11 | (2006.01) |
| B01D 29/96 | (2006.01) |
| B01D 35/147 | (2006.01) |
| B01D 35/30 | (2006.01) |

(52) U.S. Cl.
CPC .............. *F01M 11/03* (2013.01); *B01D 29/11* (2013.01); *B01D 29/96* (2013.01); *B01D 35/147* (2013.01); *B01D 35/306* (2013.01); *B01D 2201/0415* (2013.01); *B01D 2201/291* (2013.01); *F01M 2011/031* (2013.01)

(58) Field of Classification Search
CPC ...... B01D 2201/0415; B01D 2201/291; B01D 2201/305; B01D 46/2414
USPC .......................................................... 123/196 A
See application file for complete search history.

(56) References Cited

U.S. PATENT DOCUMENTS

| 5,928,511 A | 7/1999 | Messner et al. |
| 7,833,304 B2* | 11/2010 | Pearson ............. B01D 46/0031 55/414 |
| 7,854,329 B2* | 12/2010 | Malgorn ................ B01D 29/15 210/437 |

(Continued)

FOREIGN PATENT DOCUMENTS

| CN | 1133198 A | 10/1996 |
| CN | 103958022 A | 7/2014 |

(Continued)

*Primary Examiner* — Long T Tran
*Assistant Examiner* — James J Kim
(74) *Attorney, Agent, or Firm* — Quarles & Brady LLP; Yakov S. Sidorin

(57) ABSTRACT

A filter cartridge includes a filter element (forming a fluid channel with a first longitudinal axis) with a front side to which a front end cap is sealingly attached, a conduit (with rear and front ends) attached to the front end cap, and a through hole (in the front end cap) that provides a fluid communication between the channel and the conduit, to enable oil flow from the channel via the rear end of the conduit through the conduit to its front end. Pressure drop for a given oil flow rate is reduced if the conduit has a straight end section (defining a second longitudinal axis) in the vicinity of its front end. The second longitudinal axis intersects the first longitudinal axis at a single point to define a non-zero angle α between the axes.

16 Claims, 5 Drawing Sheets

(56) References Cited

U.S. PATENT DOCUMENTS

| | | | |
|---|---|---|---|
| 8,177,971 B2* | 5/2012 | Bittle | B01D 46/2411 |
| | | | 210/232 |
| 8,276,763 B2 | 10/2012 | Shaam | |
| 8,916,044 B2 | 12/2014 | Rapin | |
| 9,044,695 B2 | 6/2015 | Sann et al. | |
| 2004/0035097 A1* | 2/2004 | Schlensker | B01D 46/0012 |
| | | | 55/498 |
| 2010/0064646 A1* | 3/2010 | Smith | B01D 46/0005 |
| | | | 55/501 |
| 2015/0209705 A1* | 7/2015 | Morris | B01D 35/005 |
| | | | 210/232 |

FOREIGN PATENT DOCUMENTS

| | | |
|---|---|---|
| DE | 3732341 | 9/1987 |
| DE | 29509806 | 8/1995 |
| DE | 29613703 | 8/1996 |
| DE | 29613705 | 10/1996 |
| DE | 102005015918 | 10/2005 |
| DE | 202005008679 | 10/2006 |
| DE | 102008006925 | 7/2009 |
| DE | 102008031326 | 1/2010 |
| DE | 102009042143 | 3/2011 |
| DE | 102009042143 A1 | 3/2011 |
| DE | 112009002126 | 7/2011 |
| DE | 102011080617 | 2/2013 |
| EP | 1343574 | 9/2003 |
| EP | 1967247 | 9/2008 |
| WO | 2014057323 | 4/2014 |
| WO | 2015112458 | 7/2015 |

* cited by examiner

OIL FILTER CARTRIDGE AND HOUSING FOR AN OIL FILTER CARTRIDGE

CROSS-REFERENCE TO RELATED APPLICATIONS

This application is a continuation of pending International Application No. PCT/EP2017/062063 filed on May 19, 2017, which designates the United States and claims priority from the European Application No. 16170925.8 filed on May 23, 2016. The disclosure of each of the above-identified patent applications is incorporated herein by reference.

BACKGROUND

1. Field of the Invention

The invention relates to an oil filter having a filter element and at least a front end cap that is attached to the filter element and that provides an oil conduit configured to couple the oil filter cartridge to an oil outlet of an oil filter housing. The invention as well relates to an oil filter housing that is configured to receive the oil filter and to a kit comprising the housing and the oil filter.

2. Description of Related Art

Oil filters are crucial elements in combustion engines, and have to be replaced regularly to ensure reliable operation of the combustion engines. The oil filter systems typically include a replaceable oil filter cartridge (referred to as a 'filter cartridge' or simply 'cartridge') and a housing configured to accommodate the cartridge. The housing positions the cartridge in between an oil inlet and an oil outlet, such as to enable an oil flow through the filter element of the cartridge. The cartridge typically includes a filter element that has a tubular shape. The tubular filter element is disposed between two end caps. In operation, the oil flows from the oil inlet into the housing accommodating the cartridge and then radially inwards through the filter element, whereby suspended contaminants are separated (at least to a large ex-tent) from the oil and remain in (are retained by) the filter element. The oil pouring through the filter element is withdrawn from the hollow space (that is enclosed by and defined by the tubular filter element) through an oil conduit, which is provided by at least one of the end caps. The end cap is referred to herein as a front end cap. The oil conduit is in fluid communication with the outlet. Different embodiments of this kind of filter cartridges are disclosed, for instance in WO 2015112458 and US 2016038859 A1.

DE 10 2008 006 925 A1 shows an oil filter assembly with a filter element in a canister of an oil filter housing. The filter element has a central oil channel and an end cap. A ring shaped protrusion of the end cap provides a conduit in fluid communication via a through hole of the end cap with the central oil channel.

DE 10 2011 080 617 A1 relates to a filter cartridge having a filter element. The filter element has a central oil channel defining a longitudinal axis. Attached to the filter element is an end cap. A straight conduit is attached to and in fluid communication with a through hole of the end cap, thereby establishing a fluid communication with the oil channel of the filter element. The longitudinal axis of the conduit and the longitudinal axis of the filter element are the same.

DE 10 2009 042 143 A1 suggests a filter system for agricultural machines with a filter housing, the latter defining a chamber for receiving a filter cartridge. The filter cartridge contains two elements, a filter element and a support element.

US 2015/0209705 A1 discloses a filter assembly having an oil filter housing including a filter base and a canister for receiving a filter cartridge referred to as filter element. The filter element has end caps and includes a tubular member extending through a through-hole in a first of the end caps. The tubular member has two oil ducts and defines a longitudinal axis. In operation, unfiltered fluid is provided to the first chamber and flows through a first section of the filter element into an interior space of the canister, thereby being filtered. Within canister, the fluid flows around the filter element and enters (via the filter element) the second chamber, thereby undergoing a second filtration. The fluid is removed from the filter element 16 through the second chamber.

DE 296 13 703 U1 relates to an oil filter assembly with a housing. The housing has socket and a canister for receiving a filter cartridge. The filter cartridge has a filter element in between of two end caps as claimed. The end cap is plugged on the socket.

WO 2014/057323A1 discloses a filter cartridge having a filter wall in between the two end caps. The one of the end caps has a through hole with a gasket for sealingly connect to a socket of an oil filter housing.

DE 295 09 806 U1 suggests a filter cartridge with a filter element in between the two end caps. The filter element has a central oil channel and the end caps have through holes, one for enabling an oil flow out of the filter element into a conduit of the socket, and the other—for removably introducing a support structure, attached to a housing cover, into the fluid channel.

U.S. Pat. No. 5,928,511 A discloses an oil filter assembly with a housing and a cover for accommodating an exchangeable filter element.

DE 37 32 341 A1 relates to a lubricant filter housing having a pin for attaching the housing to a combustion engine. The pin is inclined relative to the housing axis to reduce the contour of the combustion engine.

In present combustion engine developments, the oil filter housing is bolted to the motor block. The space, available for the oil filter housing, is further and further reduced. In addition, the power required for driving the oil pump has to be reduced, as this has a direct effect on fuel efficiency (such as, for example, a reduction of $CO_2$-emissions at a rated power).

SUMMARY

Embodiments of the invention solve the problem of reducing the amount of power required to drive the oil pump of a combustion engine.

The idea of the invention is based on the realization that the power for driving the oil pump can be reduced by reducing the pressure drop over the oil filter for a rated oil flow through the oil filter. Further, due to the enhanced complexity of the combustion engines existing to-date, the structurally-available space, configured to accommodate an oil filter housing, is further and further reduced. This leads to the problem that the oil distribution over the circumference of the filter element becomes increasingly inhomogeneous with reduced size of the oil filter housing. In addition, oil removal through the oil conduit of the end cap becomes problematic if such space is limited.

These problems are addressed by a specific filter cartridge, having—as usual—a filter element that forms a fluid channel with a first longitudinal axis. In practice, such filter element is often a paper filter formed by at least one strip of filter paper that has been folded back and forth to provide accordion-like pleats or folds. The first and the last sections of the folded paper strip are connected and, as a result, the filter element forms a central channel substantially surrounded by the pleated or folded filter-element material. In other words, the filter element encloses (defines) the channel with a star-like cross section. The channel has a longitudinal extension and thus defines the first longitudinal axis, also referred to as filter axis. The filter axis can be considered to be a symmetry axis of the filter element and—assuming regular pleats—there exists a degree of rotation of the filter element around the longitudinal axis as a result of which the filter element is projected upon itself.

At least one front end cap is sealingly attached to a front side of the filter element. Of course a second (rear) end cap may be sealingly attached to the rear side of the filter element as well. The front and rear sides are considered to be faces or facets of the filter element, the normals to the facets are substantially parallel to the filter axis. In operation, oil drains from the outside of the filter element radially into the central channel and thus towards the filter axis. The end caps ensure that the oil does not bypass the filter element. The cleaned oil is, therefore, collected or received by the central channel, and the front end cap has an opening therethrough (a through hole) to enable the filtered oil to flow out of the cartridge.

A conduit with a rear end and a front end is sealingly attached to the front end cap. The conduit is configured to provide, in operation, a flow path for the oil leaving the central channel. Thus, in operation, the through hole in the front end cap provides, generally, fluid communication between the central channel and the conduit, thereby enabling an oil flow from the central channel via the rear end through the conduit to the front end. For example, the rear end of the conduit may be attached to the front side of the front end cap, to surround the through hole. The front side of the end cap is the side facing away from the filter element; such front side is preferably at least approximately orthogonal to the filter axis. Alternatively, the outer shell of the conduit may be attached to a surface of the front end cap enclosing (and thus defining) the through hole.

Preferably, the conduit has a straight end section in the vicinity of the second end. Such end section defines a second longitudinal axis, referred to as conduit axis. The conduit axis can essentially be considered to be the symmetry axis of the straight end section of the conduit. In a preferred embodiment the complete conduit is straight, at least its half that is facing the front. This conduit axis preferably intersects the filter axis at a single point (i.e. the two axes are not parallel, but define an angle $\alpha$, with $0°<\alpha<180°$. In other words, the conduit for withdrawing the oil from the channel is inclined with respect to the filter axis and, therefore, with respect to the channel axis. This inclination leads to a number of effects that are not apparent at first sight, but that cause enhancement of efficiency of the combustion engine: Due to the reduction of space in the filter housing, the pressure difference between the inlet and the outlet of the oil filter system, required to provide a defined oil flow rate, is increased. This pressure difference—or pressure drop—is due to the fact that the oil line receiving the filtered oil from the oil outlet has to be bent at quite small radii to comply with the given space requirements. Decrease of the space or gap between the filter housing and filter cartridge increases the flow resistance and, therefore, this pressure drop. The increase in the pressure drop has to be compensated by the combustion engine's oil pump, and the additional pressure directly translates into an augmented power requirement of the oil pump. The augmented power requirement of the oil pump reduces the engine's efficiency, yielding higher $CO_2$ emission levels per rated engine power. The presence of the inclined conduit axis, however allows for a significant reduction of the pressure drop of the filter assembly, because the change in direction/orientation in the filter housing, required to provide the oil to the fresh oil supply line, is not as abrupt. Further, simulations showed, that withdrawing the filtered oil from the channel along an axis that is inclined (at a non-zero angle) relative to the filter axis does not add a pressure drop, as compared to the situation when the oil is withdrawn via a coaxial conduit, but the subsequent pressure drop for redirecting the oil in the socket of the housing can be omitted or at least reduced. In addition, the conduit that is appropriately inclined may have a larger diameter as compared to a coaxially aligned conduit, due to its inclination. In either case the distribution of the non-filtered oil that has to pass by the edges of the end cap, can be enhanced as will be explained below in more detail. A further advantage provided by the proposed configuration stems from the fact that the space in the socket of the housing can be used more efficiently, for instance for placing a port for bypass valves and the like.

In one embodiment, the inner diameter of the end section is essentially constant, whereas the outer diameter of the end section is reduced at least in the last portion located towards the free end of the conduit. Alternatively, the conduit contains a coupling section, where the inner diameter is reduced towards its front end and the outer diameter is reduced as well, but with a bigger slope. Thus, the last section of the conduit may have a reduced wall thickness. This reduced wall thickness improves positioning the conduit onto a coupling surface of an oil outlet of the housing, as explained below in detail with respect to the figures.

Preferably, the second end defines a circular flange centered around the conduit axis, and such circular flange is configured to connect the filter cartridge to a corresponding coupling of an oil line. The circular diameter of the opening further reduces the flow resistance.

Advantageously, a rim may extend from the end cap into the channel, where a protrusion extends from the rim towards the first longitudinal axis. The rim may be used for centering the filter cartridge relative to a centering pin, extending from the housing via the conduit into the channel. The protrusion may be caught or accommodated by a groove or another type of guide or rail in or attached to the centering ping to rotate the filter cartridge around the filter axis (if required), when the filter cartridge is advanced towards the socket. Briefly, the protrusion may be configured to engage into a guide, for instance a groove or another type of recess of the centering pin. In a related implementation, the protrusion and the guide can be inverted, i.e. the protrusion may be attached to the centering pin and the guide may be formed by the rim. In both cases, the orientation of the inclined conduit can be reliably defined when inserting the filter cartridge into the housing. The centering pin is preferably hollow, to enable, in operation, an oil flow through the centering pin to the oil outlet. In this sense, the centering pin can be considered to be a tubular extension of the socket or even of the oil outlet.

For example, the rim maybe annular, or be configured as a segment of a ring, or comprise ring segments and have a center that is offset from the first longitudinal axis. As a result of the offset, the arrangement is formed that provides a positive locking of the filter cartridge in the radial direction but not in a longitudinal direction, enabling the guidance of the filter cartridge along the conduit axis to thereby enhance a reliable connection of the inclined end section of the conduit and the corresponding coupling of the housing. The arrangement may also enable the pivoting and/or rotational movements. Due to the inclination of the conduit axis with respect to the filter axis, as mentioned above, the movement of the filter cartridge (during the process of attachment of the conduit to the coupling) has a first movement component that is parallel to the filter axis. Such movement also has a second component that is directed radially (with respect to the filter axis). In this example, the radial direction is defined by the offset of the annular rim's center.

The value of the angle $\alpha$ between the filter axis and the conduit axis is preferably between 5° and 45° (i.e. $5° \leq \alpha \leq 45°$), even more preferably between 10° and 35° ($10° \leq \alpha \leq 35°$), or even more preferably between 15° and 30° ($15° \leq \alpha \leq 30°$).

In addition to the front end cap, the cartridge preferably includes a rear end cap that is as well sealingly attached to the filter cartridge. Here, the axial end of the filter cartridge (that contains the conduit configured to connecting the cartridge to the oil outlet) is referred to as the front end, i.e. the end configured to be inserted into a corresponding socket of an oil filter housing. Thus, the rear end cap is attached with its front side to the rear side of the filter element. The rear end cap may close the rear end of the channel.

Preferably, the rear end cap forms a plain bearing together with the cover of the housing. This plain bearing may enable a rotation of the cover relative to the filter element. Thus, the filter cartridge may be inserted into an operably-complementary socket of an oil filter housing in a pre-defined orientation, and the cover may be screwed to the housing without rotating the filter cartridge that remains in its predefined position and orientation relative to the housing body. To this end, the plain bearing element may provide a bearing surface with a rotational axis. It then suffices for the cover to provide an operably complementary bearing surface. Preferably, the bearing surfaces are ring surfaces that may be segmented. For example, the cover may include at least two lands arranged concentrically around the bearing axis, each land providing a section of the bearing surface. In the same way, the corresponding bearing surface may be segmented. For example, at least two lands, each providing a segment of a bearing surface that may be attached concentrically around the rotational axis. In operation, the lands of the cover and the lands of the rear end cap preferably engage to position the rear end cap with a required play relative to the cover.

In one example, the bearing surface of the rear end cap is spherical or comprises spherical elements enabling a rotation of the cover relative to the rotational axis. In addition, the bearing surfaces enables a tumbling movement of the cover relative to the filter axis. This tumbling ability enables the tilt of the filter axis against the rotational axis of the cover when the cover is screwed to the housing body. This tilting of the cartridge axis provides and facilitates a reduced pressure drop, as will be explained below.

In another example, the rotational axis of the bearing surface is inclined with respect to the first longitudinal axis, i.e. with respect to the filter axis. Such orientation enhances the rotation of the cover relative to the cartridge if the filter axis is not aligned with the housing axis. The latter situation is favored to reduce the pressure drop of the oil filter system at a given oil flow rate (at a given viscosity).

Further, the plain bearing surface of the rear end cap is preferably eccentric relative to the first longitudinal axis. Such configuration further enhances the rotation of the cover relative to the cartridge if the filter axis is not aligned with the housing axis.

The plain bearing element comprises at least two ring segments, and preferably four ring segments. Ring segments (present instead of a closed ring) simplify manufacturing of the rear end cap as the end cap can be removed as well from a static mold, i.e. from a mold that does not provide movable elements, to enable removing of the plain bearing element. In a particularly preferred embodiment, the edges of the rings segments pointing in the tangential direction (with respect to the rotation of the cover) are rounded or flattened to ease the rotation of the cover.

Preferably, the radius of the bearing surface is increased with increase of a distance from the filter element, or decreased with increase of such distance (in other words, the radius of the bearing surface does not remain constant as a function of distance from the filter element). The bearing surface may for instance provide at least a section that is similar to frustum of a cone or a barrel. This change in radius serves not only to enable the application of a force in the axial direction, but in addition to facilitate the self-centering of the read end cap relative to the rotational axis of the bearing (and, therefore, the cover).

As the skilled artisan will readily appreciate from the above, the filter cartridge can be inserted into an operably-complementary filter housing ('housing', for short). The housing includes a body with a socket. The socket is configured to provide support for a front end cap of the filter cartridge. The support defines a first axis, referred to as support axis. This support axis is essentially the symmetry axis of the support and substantially orthogonal (within the limits of about 10 degrees, preferably within the limits of 2.5 degrees, and even more preferably within the limits of 1 degree) to the end cap's support facing side. The support further contains at least an oil inlet (configured to provide unfiltered oil to the cartridge) and an oil outlet (configured to remove filtered oil from the cartridge). The housing further includes a canister-like cover with a bottom and a ring-shaped sidewall, where the canister-like cover is configured to sealingly cover the socket and to provide a space dimensioned to accommodate the filter cartridge in between of the socket and the bottom. Here, the sidewall of the cover defines a longitudinal housing axis, briefly housing axis. The oil outlet forms a circular surface sized to receive an end section of a filter cartridge's conduit. The circular surface thus provides a coupling configured to connect the circular surface with the conduit of the filter cartridge. The circular surface defines a second longitudinal axis (its symmetry axis, also referred to as a coupling axis). This coupling axis intersects the housing axis in a single point and thus defines an angle $\beta$. The angle $\beta$ is preferably of the same size as the angle $\alpha$ between the filter axis and the conduit axis ($\pm 2°$).

Preferably, the housing provides a side wall enclosing the filter cartridge (if inserted). A gap, present between the front end cap and the side wall, enables oil to flow from the oil inlet to the outer side of the filter element. This gap has a non-constant (not uniform) width (that is, a first width in a first portion of the gap and a second width in a second portion of the gap, the first width being smaller than the second width) and the oil inlet of the housing is positioned closer to (is spatially biased towards to) the section of the gap that has larger width (that is a width that is larger than a width in a different portion of the gap). In other words, the distance from the support to the side wall is non-constant and defines the spatially non-uniform with of the gap. Due to the non-constant-in-size gap, the pressure drop of the oil is different, depending on a location along the circumference of the end cap. This difference is preferably judiciously defined to compensate, in operation, for an inhomogeneity in the in the oil flow over the circumference of the end cap. In other words, closer to the oil inlet the gap is wider, whereas further away from the oil inlet the gap is narrower.

Filter elements as such are well known in related art, and this disclosure does not focus on the particular type of the filter element. Often (as well as in present embodiments) paper filters may be used. To this end, a strip of filter paper can be folded in a zig-zag fashion and the free ends of the strip may be attached to provide a tubular filter element with a zig-zag-like folded tube wall.

It should be noted that below, for simplicity of illustration only, the front end cap and the conduit are considered to be separate pieces. In practice, the front end cap and the conduit may be connected or even form a single part, and be manufactured, for instance, by injection molding.

BRIEF DESCRIPTION OF THE DRAWINGS

In the following, the invention will be described by way of example, without limitation of the general inventive concept, on examples of embodiment and with reference to the drawings.

Figure 1:
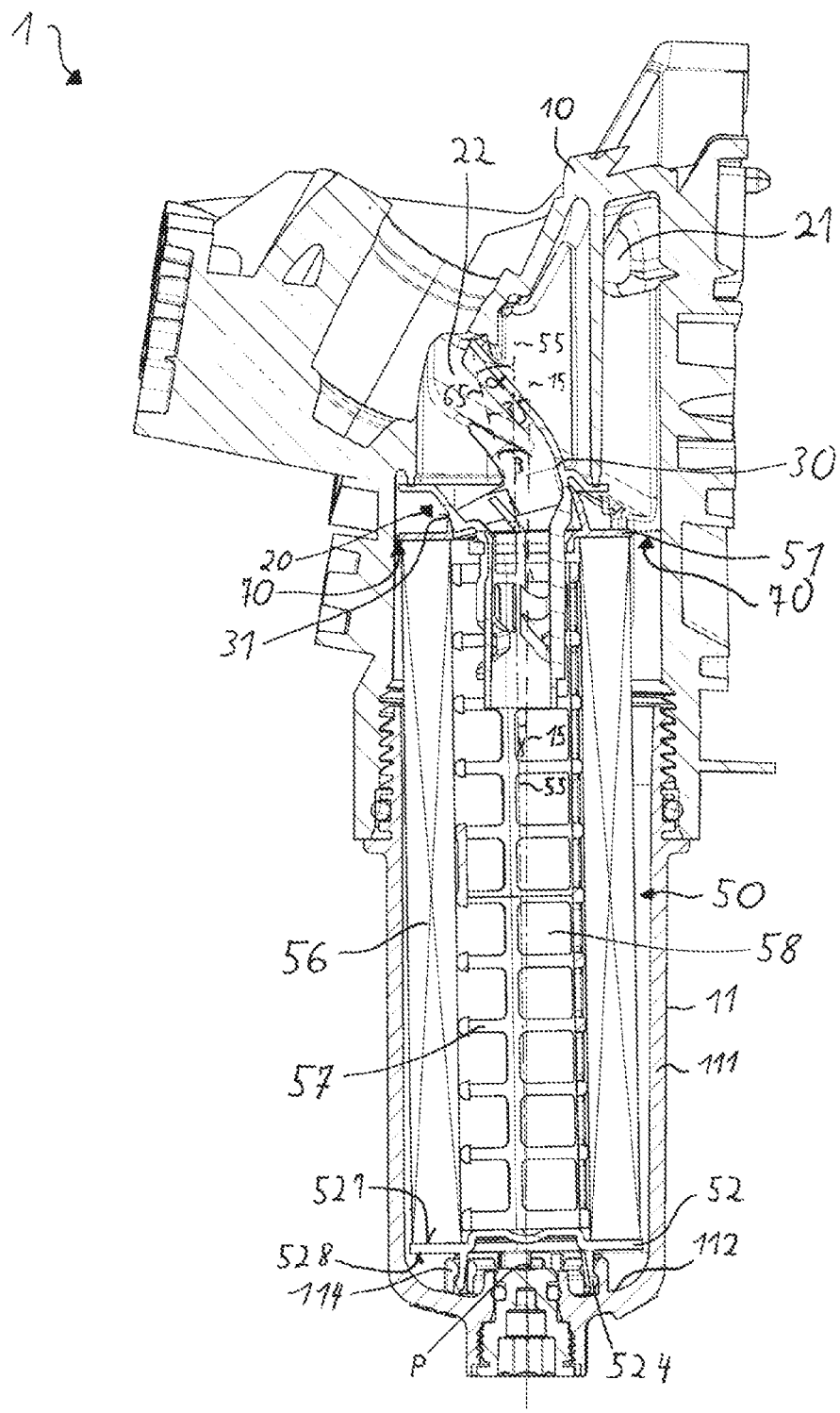
FIG. 1 shows a section of an oil filter assembly with an oil filter cartridge.
Figure 2A:
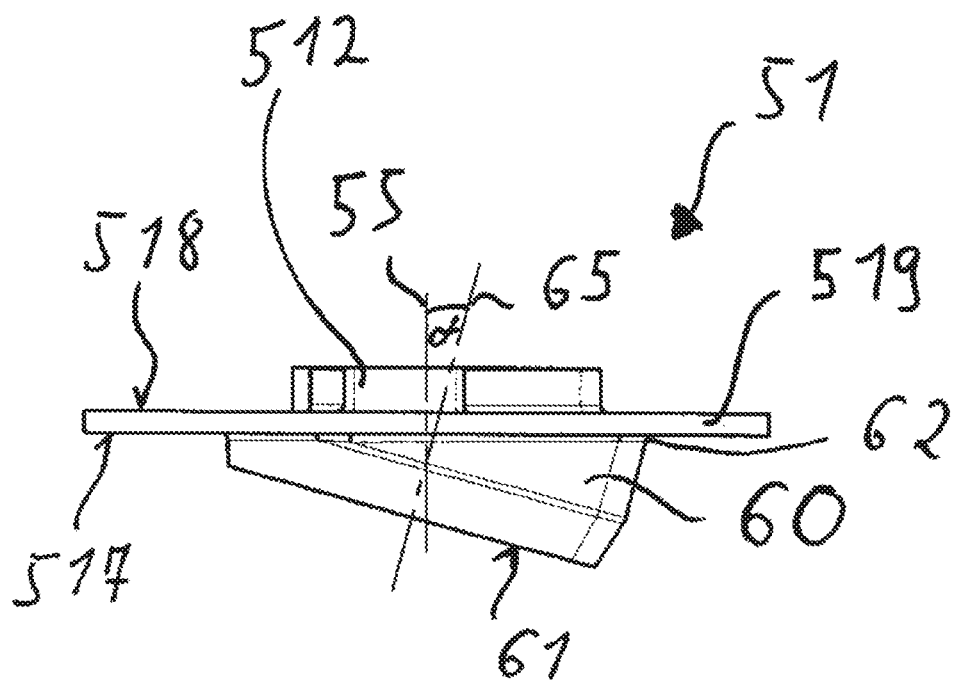
FIG. 2A shows a side view of a front end cap of an oil filter cartridge of FIG. 1.
Figure 2B:
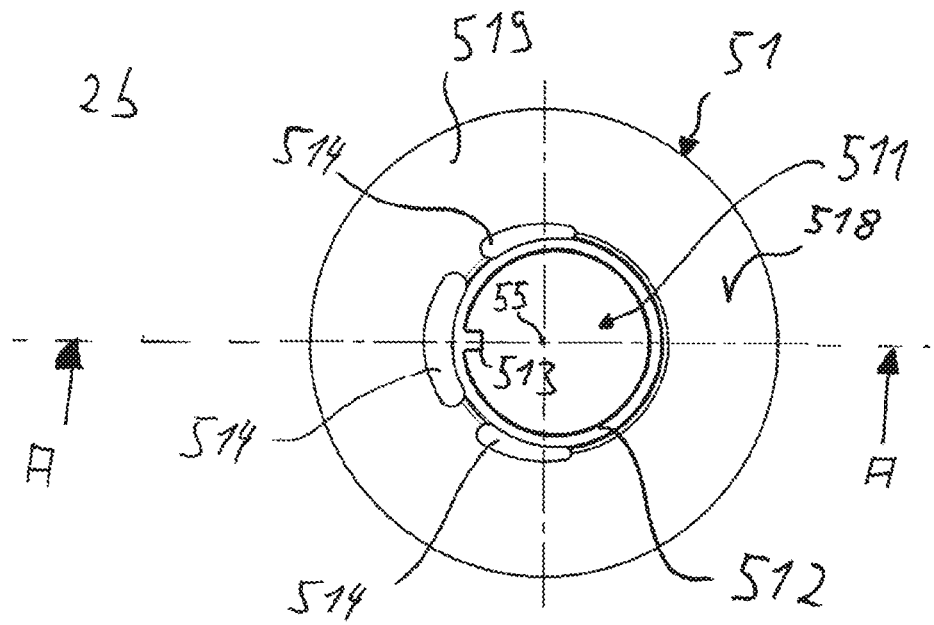
FIG. 2B shows a top view of a front end cap of an oil filter cartridge of FIG. 1.
Figure 2C:
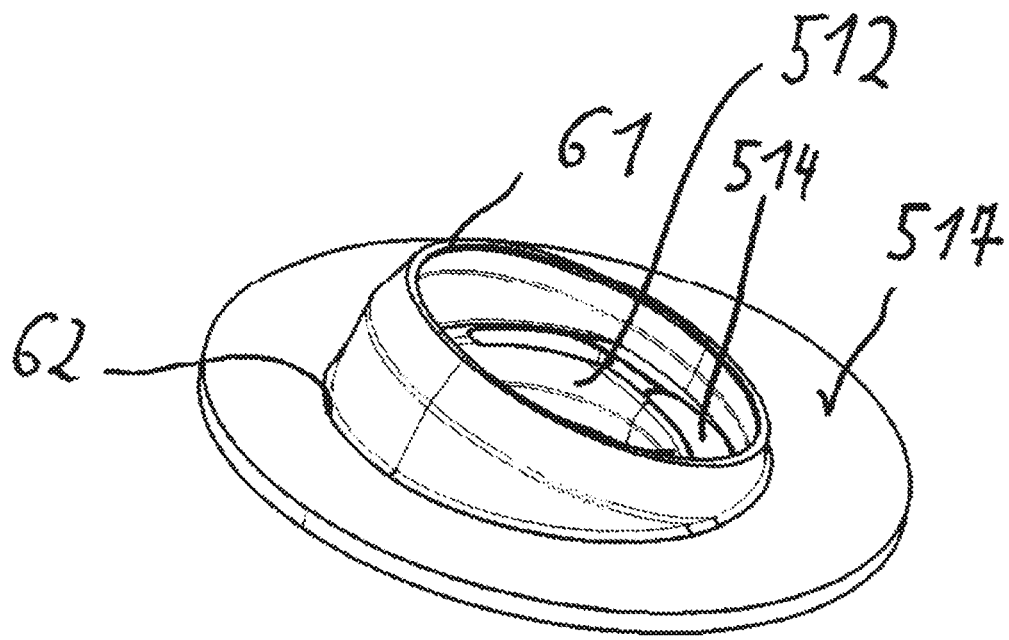
FIG. 2C shows an isometric view of a front end cap of an oil filter cartridge of FIG. 1.
Figure 2D:
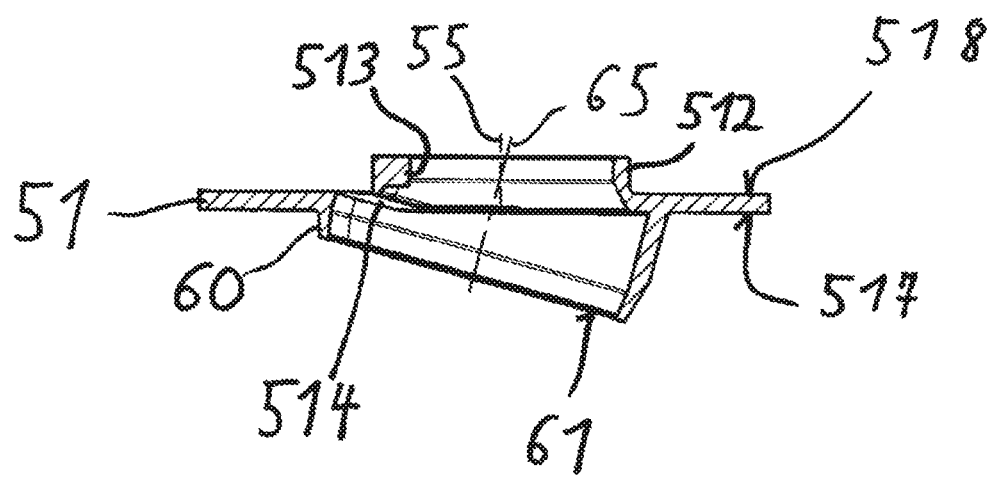
FIG. 2D shows a cross section along plane A-A as indicated in FIG. 2B.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In FIG. 1 an oil filter assembly 1 is depicted. The oil filter assembly 1 has housing with a housing bottom 10, dimensioned to be attached to a motor block of a combustion engine (for instance an Otto or a Diesel engine). The housing top 11 (referred to as cover 11) is provided by canister 11, covering a space sized to accommodate a filter cartridge 50, provided between a socket of the housing bottom and the housing top 11. The cover 11 has a side wall 111 and a cover bottom 112. The space enclosed by the socket and the cover 11 has a longitudinal symmetry axis 15, defined by the cover's side wall 111 and the cover's bottom 112. Each of the cover 11 and the housing bottom 10 provides a thread enabling to removably attach the cover 11 to the housing body 10.

The socket of the housing body 10 comprises an oil inlet 21, an oil outlet 22, and a support configured to support a front end cap 51 of the filter cartridge 50. The support is provided by an adapter 30, which is replaceably attached to the housing bottom 10. In this example, the adapter resides on a wall that is formed by the socket. In an alternative arrangement, the adapter 30 and the housing bottom may be formed as a single piece, or at least parts of the adapter 30 can be integrally formed with the housing bottom. In this example, the adapter 30 is present only to ease manufacturing of the socket, as the adapter 30 provides functions of the socket, the adapter 30 can be considered to constitute a part of the socket and thus of the housing 10.

The oil filter cartridge 50 includes a filter element 56 with a symmetry axis 55 defining a filter axis or, in other words, a cartridge axis. The filter element 56 surrounds a tubular reinforcement 57 (providing a radial abutment for the filter element 56) and forms a tubular fluid channel 58. In operation, the oil pressure pushes the filter element radially inwards. The reinforcement 57 adsorbs the corresponding pressure force and protects the filter element from collapsing. A first end cap 51 (also referred to as the front end cap 51) is attached to a front side of the filter element 56, i.e. to the side facing towards the socket. The front end cap 51 has a through hole 511 defining the axis 511A that is parallel to and spatially offset from the axis 55. A conduit 60 is attached to the front side of the front end cap 51. The conduit 60 has a rear end 62, surrounding the through hole 511 and a front end 61, that is sealingly (but removably) engaged to the support, to enable a fluid flow from the fluid channel 58 via the through hole 59 and the conduit 60 to the oil outlet 22 of the housing bottom 10. A second end cap 52 (the rear end cap 52) is attached to the opposite, i.e. rear end of the filter element 56. This second end cap 52 is closed.

In operation, the oil flows from the oil inlet 21 through the housing to the filter element 56, more precisely to the radially outward facing side of the filter element 56. The oil passes the filter element 56 and contaminants are at least in part removed from the oil. The oil exits the filter element 56 at its radially inward facing side and enters the tubular fluid channel 58. The oil flows through the through hole 59 and the conduit 60 to the oil outlet 22 of the housing bottom 10.

As can be seen in FIG. 1, the filter axis 55 is inclined with respect to the housing axis 15. The two axes 15, 55 intersect approximately in the middle of the length of the filter element (at a point located within a distance range of ±25% of the length of the filter element 56 from the middle point, preferably ±12.5% or even more preferably within a range of ±5% of the length of the filter element from the middle point of the filter element). In other words, the filter axis and thus the filter cartridge are tilted relative to the housing axis 15. Such tilting or inclination provides an asymmetric gap 70 (and thus the asymmetric oil passage) between the front end cap and the filter housing 10. As depicted, gap 70 has its maximum width at a location close to the oil inlet 21 and its minimum at a location close to the opposite end of the front end cap 51. The maximum width of the gap 70 is indicated as dotted line. This asymmetric gap reduces the pressure drop for the oil delivery from the oil inlet 21 to the filter element 56, as compared to a symmetric arrangement of the same cartridge in housing with the same diameter of about 3% (as provided by numerical simulations based on the use of 5W-30 at 110° C.). The width of the gap is the distance between the outer edge of the front end cap 51 and the housing wall. It can be calculated by assuming that the side wall 101 of the housing 10 defines a radius with respect to the housing axis 15 at the height of the front end cap 51, i.e.

in the vicinity of the front end cap 51. When assessing the radius, one should consider the side wall to be circular and neglect recesses that have been required to place valves and the like in the between of the filter cartridge 50 and the side wall 101. The gap then has the shape of a ring with a non-constant width that depends on direction (the azimuthal angle) with respect to the housing axis 15. The width as a function of the azimuth angle is a difference between the radius of the side wall 101 and the distance separating the outer edge of the front end cap 51 from the housing axis 15.

This tilting of the cartridge 50 relative to the housing axis 15 is mainly due to the front end cap 51, which is depicted in detail in FIG. 2: As can be seen in FIG. 2A and FIG. 2B, the end cap 51 comprises an essentially circular disk 519, centered at the filter axis 55. The disk 519 has a through hole 511, which is circularly cylindrical as well, but eccentric relative to the filter axis 555 being as well the disk axis 55 (cf. as well FIG. 2C and FIG. 2D). On the rear side 518 of the front end cap 51, is an annular rim 512, centered with the trough hole 511. The rim 512 is essentially a circularly cylindrical ring 512, attached to the rear side of the front end cap 51. The rim 512 supports a protrusion 513 configured to orient the end cap rotationally relative to the socket. When inserting the cartridge into the housing bottom, a tubular extension of the adapter is inserted into the rim 512. The tubular extension provides is a centering pin and provides a groove. The protrusion 513 is configured to engage into the groove. If the protrusion does not engage, the cartridge 50 cannot be lowered, because the protrusion abuts the filter facing side of the extension. The protrusion 513 thus defines the rotational orientation of the filter cartridge relative to the housing axis 15.

On the front side 517 of the disk 519, there is the conduit 60. The conduit 60 is essentially a straight tubular segment having a longitudinal axis 65 (see FIG. 2D). The conduit 60 is attached to the front side 517 of the disk 519 to provide non-vanishing angle α. In this example, α is about 15° (±10°, preferably ±5°, more preferred ±2.5%). The inner surface of the conduit 60 is essentially circularly cylindrical, and thus the (front) end 61 of the conduit 60 can be viewed as having a circular shape centered relative to the conduit axis 65 (but an oval relative to the filter axis 55). The wall thickness of the conduit's front end 61, providing a coupling section, is reduced to provide a front end section of the conduit 60 that resembles a truncated cone. The inner diameter of the coupling section is slightly reduced, to enhance a tight fit to the coupling surface of the socket. In this example the socket is provided by the adapter 30. The socket 20 (here the adapter 30) provides a circular cylindrical surface 31, the coupling surface 31. The coupling surface is configured to receive the end section of the conduit 60, wherein the cylindrical surface defines a cylinder axis (the head of the arrow pointing to the coupling surface 31 is placed for better visibility, only, on an extension of the coupling surface 31). As can be seen in FIG. 1, the cylinder axis 35 intersects the housing axis 15 (more precisely the projections of the axes 15, 35 onto the plane of projection intersect) in a single point and thus defines an angle β, to thereby provide a guiding surface 31 configured to guide a straight end section of a circular conduit 60 along the cylinder axis 35 towards to thereby provide a tight engagement (in practice, friction fit), of the cylindrical surface 31 with the conduit 60, that is practice provides a fluid seal preventing the leak of oil. When attaching the conduit 60 to the socket, the cylinder axis 35 and the conduit 65 axis are aligned, i.e. mapped onto each other.

The inner diameter of the conduit 60 is bigger than the outer diameter of the rim 512. Additional holes 514 in the end cap 51 enlarge the effective diameter of the through hole, reducing the pressure drop provided by the end cap.

When comparing the angle γ between the filter axis 55 and the housing axis 15 and the angle α between the filter axis 55 and the conduit axis 65, it turns out that γ<α (see FIG. 1). The conduit angle α thus overcompensates the tilting angle γ. This over compensation provides an additional degree of freedom in placing the oil outlet 22 in the housing bottom 10. The with respect to FIG. 1 the oil outlet 12 could be placed farther away from the oil inlet 21, enabling to enlarge the diameter of the passage connecting the oil inlet with the gap 70.

Figure 3:
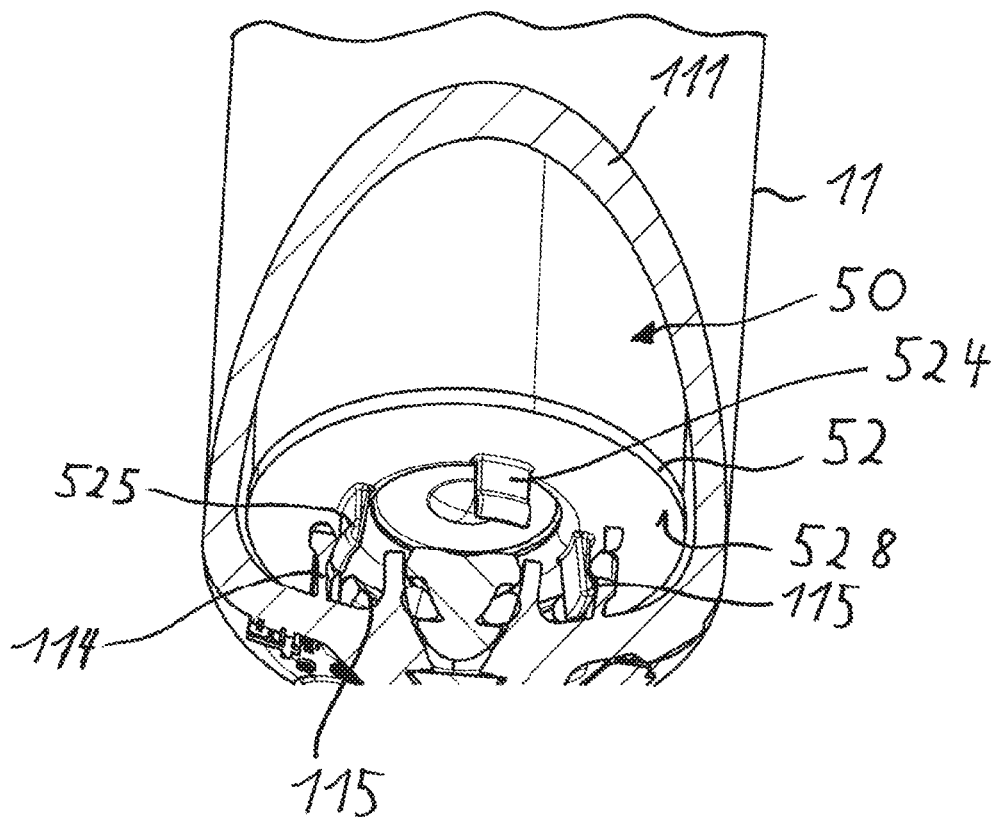
FIG. 3 a detail of a cover and the rear end of an oil filter cartridge.

A second so called rear end cap 52 is attached to the rear end of the filter element 56 (see FIG. 1) and interacts with the cover 11. As depicted in FIG. 3, the cover 11 may include lands 114 that are arranged around the housing axis 15, in other words, each land 114 is a ring segment. The lands may each have a protrusion 115 with a preferably spherical surface facing towards lands 524 of the rear end cap 52. The lands 524 of the rear end cap are as well referred to as 'fingers 524', but only for linguistic distinction relative to the lands 114 of the cover 11. The protrusions 115 engage in an operably complementary, preferably spherical groove 525 provided by the fingers 524. The fingers 524 and the lands 114 thus form a plain bearing enabling the cover 11 to rotate while the cartridge 50 remains in its position relative to the housing 10. Relative to the cover 11 the cartridge wobbles, as the filter axis 55 and the housing axis 15 are inclined relative to each other. The fingers 524 can thus be considered to be bearing elements with a bearing surface and the lands 114 are operably complementary bearing elements with an operably complementary bearing surface. In a preferred embodiment the bearing surfaces are spherical.

Figure 4:
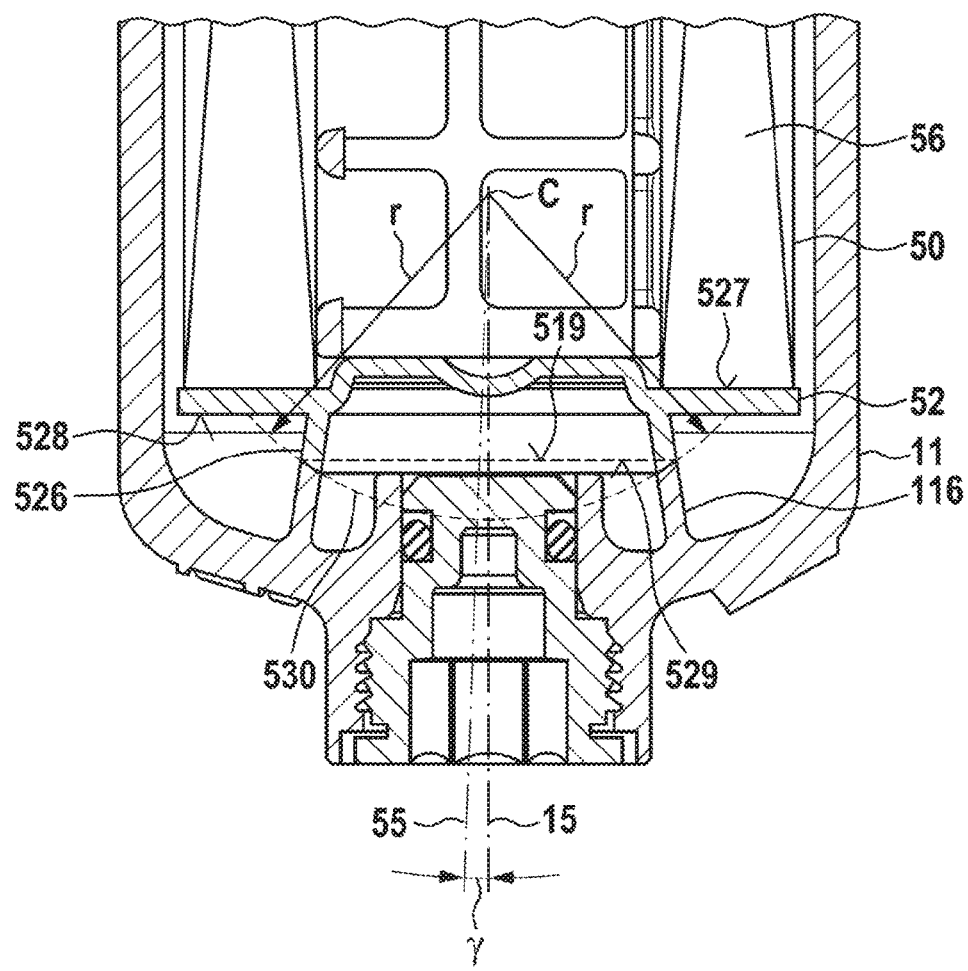
FIG. 4 a detail of further embodiment of the oil filter cartridge of FIG. 1 and of the cover 11 of FIG. 1.

Another possibility for a plain bearing between the cartridge 50 and the cover 11 is depicted in FIG. 4. Beyond the cartridge 50 and the housing may be identical to the embodiment of FIG. 1. In FIG. 4, the filter cartridge 50 comprises a rear end cap 52, attached to the rear side of a filter element 56. Attached to the rear side 528 of the rear end cap 52 is a ring 526 providing a free end, facing away from the filter cartridge 50. This free end provides a bearing surface 529 facing away from the filter cartridge 50. As will be explained below, this bearing surface 529 is preferably concave or convex and spherical. This bearing surface 529 may as well be positioned directly on the rear facing side of the end cap, i.e. the height of the ring 526 may be zero. The bearing surface 529 of the rear end cap 52 faces away from the filter cartridge 50 and is preferably spherical with a radius r, i.e. it may be a segment of a sphere centered at C and having radius r. In this example, the center C of the sphere is inside the filter cartridge 50 on the cartridge axis 55. The bearing surface 529 is thus slightly convex. Alternatively, the center C could be outside the filter cartridge 50 on the axis 55. Then, the bearing surface 529 would be slightly concave. The bearing surface 529 has a counterpart: It abuts a bearing surface 119 on a land of a preferably segmented ring facing towards the socket 20 and thus towards the cartridge 50. The two bearing surfaces 529, 119 provide a plain bearing enabling to rotate the cover 11 relative to the cartridge 50 around the housing axis 15 and at the same time to (preferably) pivot the cartridge axis 50 relative to the housing axis 15, i.e. to enable a wobbling type of movement of the cartridge 50 relative to the cover 11.

The engaging lands 114 and fingers 524 as depicted in FIG. 3 may be provided in addition to releasable engage the cover 11 and the cartridge 50, as this simplifies removal of a used cartridge 50 from the housing, by simply removing the cover 11, i.e. without need to touch the oil soiled cartridge 50. In this case, the lands 114 should be spaced relative to the fingers 524 to an extend that the cartridge 50 can pivot relative to the cover 11 as defined by the bearing surfaces 529, 119.

It will be appreciated to those skilled in the art having the benefit of this disclosure that this invention is believed to provide a filter cartridge and corresponding filter housing. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 oil filter assembly
10 housing bottom
11 housing cover/canister
111 side wall of canister/cover
112 bottom of canister/cover
114 land
115 protrusion of land
119 bearing surface
15 housing axis
20 socket
21 oil inlet
22 oil outlet
30 adapter
31 cylinder surface
35 cylinder axis
50 oil filter cartridge/filter cartridge/cartridge
51 front end cap
511 through hole
512 rim/ring
513 protrusion
514 hole in end cap
517 rear side/surface of front end cap
518 front side/surface of front end cap
519 disk (of preferably circular contour)
52 rear end cap
524 land of rear end cap/finger
526 ring (can be segmented)/ring-segment
527 front side of rear end cap
528 rear side of the rear end cap
529 bearing surface
530 dotted line indicating sphere
55 cartridge axis
56 filter element
57 reinforcement
58 fluid channel
59 through hole
60 conduit
61 front end of conduit
62 rear end of conduit
65 conduit axis
70 annular gap
α angle between conduit axis 65 and filter axis 55
β angle between cylinder axis 35 and housing axis 15
γ angle between housing axis 15 and filter axis 55

The invention claimed is:

1. A filter cartridge comprising at least:
a filter element having a front side and a rear side and forming a fluid channel with a first longitudinal axis, the fluid channel configured to transport fluid along the first longitudinal axis in operation of the filter cartridge,
a front end cap including
a front seal flange having a through hole, and
a straight conduit having a second longitudinal axis, a front conduit end and a rear conduit end and affixed to a surface of the front seal flange at the through hole,
wherein the front end cap is sealingly attached to the front side of the filter element such as to establish fluid communication and enable a fluid flow, during said operation, from the fluid channel through the front seal flange and through the straight conduit,
wherein a line defined by a parallel projection of the second longitudinal axis onto a plane, which is parallel to the second longitudinal axis and which contains the first longitudinal axis, intersects the first longitudinal axis at a single point and is inclined with respect to the first longitudinal axis at an angle
to define an asymmetric gap, when the filter cartridge is installed in an axially-symmetric tubular housing structure, between the front end cap and the housing structure to reduce a pressure drop of oil flowing to the filter element during said operation.

2. The filter cartridge of claim 1, wherein an inner diameter of the straight conduit is constant along a length of the conduit, whereas an outer diameter of the straight conduit is reduced at least in a portion of the straight conduit towards the front conduit end.

3. The filter cartridge of claim 1, wherein the front seal flange is configured as a disk with the through hole.

4. The filter cartridge of claim 1, wherein the front protrusion defines a rim around the through hole affixed to one side of the front seal flange.

5. The filter cartridge of claim 4, wherein the rim is annular and is centered with the through hole that has a third longitudinal axis that is parallel to the first longitudinal axis and spatially offset from the first longitudinal axis.

6. The filter cartridge of claim 1, wherein the angle α is between 5° and 45°, i.e. 5°≤α≤45°.

7. The filter cartridge of claim 1, further comprising:
a rear end cap having a front side of the rear end cap and a rear side of the rear end cap, said front side of the rear end cap being sealingly attached to the rear side of the filter element,
a bearing element attached to the rear side of the rear end cap, and
wherein the bearing element provides a bearing surface with a rotational axis.

8. The filter cartridge of claim 7, wherein at least one of the following conditions is satisfied:
i) the rotational axis of the bearing surface is inclined with respect to the first longitudinal axis, and
ii) the bearing surface is eccentric with respect to the first longitudinal axis.

9. The filter cartridge of claim 7, wherein the bearing element comprises at least two ring segments.

10. The filter cartridge of claim 7, wherein either a radius of the bearing surface increases with increase of a distance from the filter element or the radius of the bearing surface decreases with said increase of the distance from the filter element.

11. A system comprising:
a housing body having a housing axis, and
the filter cartridge enclosed by the housing body,
wherein the filter cartridge includes:
a filter element having a front side and a rear side and forming a fluid channel with a first longitudinal axis, and
a front end cap including
a front seal flange having a through hole, and
a straight conduit having a second longitudinal axis and affixed to a surface of the front seal flange at the through hole,
wherein the front end cap is sealingly attached to the front side of the filter element such as to establish fluid communication and enable a fluid flow, during an operation of the system, from the fluid channel through the front seal flange and through the straight conduit, and
wherein a line defined by a parallel projection of the second longitudinal axis onto a plane, which is parallel to the second longitudinal axis and which contains the first longitudinal axis, is inclined with respect to the first longitudinal axis at an angle α>0° and intersects the first longitudinal axis at a single point;
and
wherein the housing body includes:
a housing bottom with a socket, the socket comprising an oil inlet and an oil outlet,
a housing top including a canister having a bottom and a sidewall, wherein the canister is configured to sealingly cover the socket and to provide a space dimensioned to accommodate the filter cartridge in between the socket and the bottom;
wherein the socket is configured to provide support for the front end cap of the filter cartridge,
wherein the socket defines the housing axis to be substantially orthogonal to a plane of the front seal flange,
wherein the oil outlet comprises a cylindrical surface configured to receive the straight conduit,
wherein the second longitudinal axis intersects the housing axis at a single point to define an angle β of inclination of the second longitudinal axis with respect to the housing axis and to provide a guiding surface configured to guide the straight conduit along the second longitudinal axis to provide a sealing engagement of the cylindrical surface with the straight conduit.

12. The system of claim 11, wherein the filter cartridge is enclosed inside a space formed by the canister and the socket, wherein the straight conduit engages with the cylindrical surface, and wherein $\beta-2°\leq\alpha\leq\beta+2°$.

13. The system of claim 11, wherein the sidewall encloses the filter cartridge to form a gap between the front end cap and the sidewall, wherein the gap has a non-constant width, and wherein the oil inlet is spatially-biased towards a section of the gap that has a larger width.

14. The system of claim 13, wherein the sidewall defines a radius with respect to the housing axis at the height of the front end cap, and wherein the gap has a shape of a ring with the non-constant width, wherein the non-constant width is defined, as a function of an azimuthal angle with respect to the housing axis, by a difference between i) the radius and ii) a distance between an outer edge of the front end cap and the housing axis.

15. The filter cartridge of claim 7, wherein the bearing element comprises four ring segments.

16. The system of claim 11, wherein an angular deviation between the first and second longitudinal axes defines an asymmetric gap between the front end cap and the housing body to reduce a pressure drop of oil flowing from the oil inlet to the filter element in operation of said system.

* * * * *